United States Patent
Shi et al.

(10) Patent No.: US 7,087,343 B2
(45) Date of Patent: Aug. 8, 2006

(54) HIGH MELT INTEGRITY BATTERY SEPARATOR FOR LITHIUM ION BATTERIES

(75) Inventors: Lie Shi, Charlotte, NC (US); Ken J. Harleson, Fort Mill, SC (US); Ta-Hua Yu, Nanuet, NY (US)

(73) Assignee: Celgard, Inc., Charlotte, NC (US)

( * ) Notice: Subject to any disclaimer, the term of this patent is extended or adjusted under 35 U.S.C. 154(b) by 413 days.

(21) Appl. No.: 10/621,234

(22) Filed: Jul. 15, 2003

(65) Prior Publication Data

US 2005/0014063 A1    Jan. 20, 2005

(51) Int. Cl.
*H01M 2/16* (2006.01)
*H01M 10/50* (2006.01)
*B32B 7/12* (2006.01)

(52) U.S. Cl. .................. 429/62; 429/144; 156/327

(58) Field of Classification Search .............. 429/62, 429/144, 145, 254, 255; 156/327
See application file for complete search history.

(56) References Cited

U.S. PATENT DOCUMENTS

| | | | |
|---|---|---|---|
| 4,464,238 A | 8/1984 | Caldwell et al. | |
| 4,650,730 A | 3/1987 | Lundquist et al. | |
| 4,731,304 A | 3/1988 | Lundquist et al. | |
| 5,091,272 A * | 2/1992 | Treger | 429/62 |
| 5,240,655 A | 8/1993 | Troffkin et al. | |
| 5,281,491 A | 1/1994 | Rein et al. | |
| 5,565,281 A | 10/1996 | Yu et al. | |
| 5,667,911 A | 9/1997 | Yu et al. | |
| 5,952,120 A | 9/1999 | Yu et al. | |
| 6,235,430 B1 * | 5/2001 | Hoshina et al. | 429/250 |
| 6,475,666 B1 * | 11/2002 | Takeuchi | 429/144 |
| 6,509,118 B1 * | 1/2003 | Pavlov et al. | 429/144 X |
| 6,511,774 B1 | 1/2003 | Tsukuda et al. | |
| 6,852,444 B1 * | 2/2005 | Zucker | 429/144 |
| 2002/0055036 A1 * | 5/2002 | Shinohara et al. | 429/62 |

FOREIGN PATENT DOCUMENTS

| | | | |
|---|---|---|---|
| EP | 262179 | * | 6/1994 |
| GB | 2298817 | | 9/1996 |
| JP | 307146/1995 | | 11/1995 |
| JP | 8-250097 | | 9/1996 |
| JP | 2642206 | | 5/1997 |
| JP | 2002-190291 | * | 7/2005 |

* cited by examiner

*Primary Examiner*—Stephen Kalafut
(74) *Attorney, Agent, or Firm*—Hammer & Hanf, P.C.

(57) ABSTRACT

The battery separator for a lithium battery is made from a nonwoven flat sheet material having high temperature melt integrity, a microporous membrane having low temperature shutdown properties, and an adhesive bonding the nonwoven flat sheet to the microporous membrane and being adapted for swelling when contacted by an electrolyte.

19 Claims, No Drawings

HIGH MELT INTEGRITY BATTERY SEPARATOR FOR LITHIUM ION BATTERIES

FIELD OF THE INVENTION

The instant invention is directed to a separator for use in lithium batteries.

BACKGROUND OF THE INVENTION

Lithium secondary batteries (or cells) have been widely accepted for use in portable power applications. Portable power applications refer to uses covering such application as laptop computers, cellular phones, and other portable devices. These devices require relatively small batteries and one industry standard is referred to as an '18650' cell, which has the nominal dimensions of 65 mm×18 mm diameter. Additionally, lithium secondary batteries (also referred to as lithium rechargeable batteries or secondary lithium ion batteries) are also particularly well suited for larger applications, such as, for example, electric vehicle applications, because of their high-energy capacity and their relatively low weight.

Lithium secondary batteries for electric vehicle applications or other applications requiring greater amounts of energy, however, may have to be significantly larger in size (i.e. volumetric). This is because the battery will, for example, be used as the energy source for the electric motor that will propel the vehicle. Since the energy required to propel the vehicle is significantly greater than that needed to energize the portable devices mentioned above, the volumetric size of the vehicle battery will be larger.

One issue surrounding lithium cells is that the lithium is a highly reactive metal, which is capable of igniting at a temperature of about 160° C. These batteries are typically made by packing the components, including the lithium-laden components, into a sealed metal can. The sealed can may rupture as a result of short-circuiting (i.e., direct contact) between the anode and cathode material. To prevent short-circuiting or minimize its consequences, a battery separator is placed between the anode and cathode to prevent direct contact.

In the commercially available lithium cells (e.g., the 18650 cell), heat generation during operation (as a result of charging and discharging) is not a significant problem as the small size lends itself well to dissipation of the heat. However, as the volume of the cell grows, dissipation of heat from the cell becomes a more significant problem. In the commercially available cells (e.g., 18650), the separators are typically made of microporous polyolefin films, which have a tendency to shrink. This is, in part, a result of the stretching required to make the microporous film.

Accordingly, there is a need to have a more dimensionally stable (or high temperature melt integrity) separator for larger cells, because if short-circuiting occurs, the rupture of the cell could be more significant because of the greater mass of lithium material contained in the larger cell.

In the art, it is known to combine microporus films and nonwoven materials to form a battery separator. See U.S. Pat. No. 6,511,774, 'Background Art,' and commercially available products, such as CELGARDO® 4000 and 5000 Series products from Celgard, Inc., Charlotte, N.C. These products are made by laminating (i.e., application of heat and pressure by smooth or patterned nip rollers) the non-woven directly to the film. However, these products can only provide dimensional stability up to 167° C. (the melting point of the polypropylene nonwoven and membrane components). In addition, their ion-transport channels are blocked during lamination and thereby reduce the efficiency of the battery.

Accordingly, there is a need to find a way to bond together the nonwoven with the high melt integrity and mircoporous film that will not inhibit ion flow between the anode and cathode and will maintain its dimensional stability at a temperature above 167° C.

SUMMARY OF THE INVENTION

The battery separator is made from a nonwoven flat sheet material having high temperature melt integrity, a microporous membrane having low temperature shutdown properties, and an adhesive bonding the nonwoven flat sheet to the microporous membrane and being adapted for swelling when contacted by an electrolyte.

DETAILED DESCRIPTION OF THE INVENTION

A battery (or cell) generally comprises an anode, a cathode, an electrolyte, and a separator. The anode, cathode, and separator are typically supplied in the form of rolls of tape that are unwound and laminated together. Unwinding may be into a 'jelly roll' (cylindrical) or a 'folded' (prismatic) shape. The anode and cathode are conventional. The electrolyte is typically added after lamination so that the battery does not become active until desired.

The high temperature melt integrity separator comprises a microporous membrane and a nonwoven flat sheet that are bonded together with an adhesive that is adapted for swelling when contacted by the electrolyte. Preferably, this separator has a thickness of 2 mils (50 microns) or less. Most preferably, it has a thickness of 1.5 mils (38 microns) or less. Preferably, this separator has a MacMullen number of 10 or less. Most preferably, it has a MacMullen number of 6 or less. High temperature melt integrity means that the separator will substantially maintain it dimensional stability and strength up to a temperature of at least 200° C., and preferably to about 380° C. Low temperature shutdown means that ion flow between the anode and cathode can be substantially terminated by pore blinding at a temperature below 130° C. Each of the components is discussed in greater detail below.

Microporous membrane refers to any microporous membrane. The membrane may be a symmetric membrane or an asymmetric membrane. The membrane may be made from a thermoplastic polymer. Thermoplastic polymers include, but are not limited to, polystyrenes, polyvinyl chlorides, polyacrylics, polyacetals, polyamides, polycarbonates, polyesters, polyetherimides, polyimides, polyketones, polyphenylene ethers, polyphenylene sulfides, polysulfones. Polyolefin are preferred. Exemplary polyolefins include, but are not limited to, polyethylene (PE, including LDPE, LLDPE, and HDPE), ultra high molecular weight polyethylene (UHMWPE), polypropylene (PP), polymethylpentene (PMP), copolymers of any of the foregoing, and mixtures thereof. The membrane may be made by any suitable process including, but not limited to, a dry stretch process (also know as the CELGARD® process) or a solvent process (also known as the gel extrusion or phase separation or extraction or wet process) or a netting (or aperture) process (the film is cast onto a chilled rol, the roll has a pattern that is embossed onto the film, subsequently the embossed film is stretched (MD/TD), whereby large pores are formed along the embossed pattern). The membrane preferably has the following characteristics: an air resistance (Gurley: the amount of time (sec) to pass 10 cc of air at 2.3 cm Hg through 1 square inch of membrane) of no more than 40 sec (preferably 9–35 sec, most preferably less than 20 sec); a thickness ranging from 5 to 500 microns (µ) (preferably 10 to 100 microns, most preferably 10 to 50 microns); pore diameters ranging from 0.01 to 10 microns (µ) (preferably 0.02 to 5 microns, most preferably 0.02 to 0.5 microns); and a porosity ranging from 35 to 85% (preferably 40 to 80%). The membrane may be a single layer membrane, a tri-layer membrane (e.g., PP/PE/PP or PE/PP/PE), or a multi-layer membrane. The membrane is preferably a shutdown separator, for example see U.S. Pat. Nos. 4,650,730; 4,731,304; 5,281,491; 5,240,655; 5,565,281; 5,667,911; U.S. application Ser. No. 08/839,664 (filed Apr. 15, 1997); Japanese patent No. 2642206 and Japanese patent application Nos. 98395/1994 (filed May 12, 1994); 7/56320 (filed Mar. 15, 1995); and UK patent application No. 9604055.5 (Feb. 27, 1996), all of which are incorporated herein by reference. Such membranes are commercially available from: CELGARD Inc., Charlotte, N.C., USA; Asahi Chemical Industry Co.; LTD., Tokyo, Japan; Tonen Corporation, Tokyo, Japan; Ube Industries, Tokyo, Japan; and Nitto Denko K.K., Osaka, Japan.

Nonwoven flat sheet refers to a plurality of fibers held together by various methods, e.g., thermal fusion, resin, solvent bonding, or mechanical interlocking of fibers, sometimes concurrently with their extrusion. Nonwoven flat sheet includes fibrous structures made by such processes as dry, wet, or air laying, needlepunching, spunbonding, or melt blowing processes, and hydroentanglement. The fibers may be directionally or randomly oriented. While nonwoven typically does not include paper, for this application, papers are included. The fibers may be made of thermoplastic polymers, cellulosic, and/or ceramics. Thermoplastic polymers include, but are not limited to, polystyrenes, polyvinyl chlorides, polyacrylics, polyacetals, polyamides, polycarbonates, polyesters, polyetherimides, polyimides, polyketones, polyphenylene ethers, polyphenylene sulfides, polysulfones. Cellulosics include, but are not limited to, cellulose (e.g., cotton or other naturally occurring sources), regenerated cellulose (e.g., rayon), and cellulose acetate (e.g., cellulose acetate and cellulose triacetate). Ceramics include, but are not limited to, glass of all types and alumina, silica, and zirconia compounds (e.g., aluminum silicate).

Additionally, the nonwoven or the fibers of the nonwoven may be coated or surface treated to improve the functionality of the nonwoven. For example, the coating or surface treatment may be to improve the adhesiveness of the nonwoven or its fibers, to improve the high temperature melt integrity of the nonwoven, and/or to improve the wettability of the nonwoven. With regard to improving the high temperature melt integrity, the nonwoven and/or its fibers may be coated or surface treated with a ceramic material. Such ceramic materials include, but are not limited to, alumina, silica, and zirconia compounds, and combinations thereof.

In the instant invention, bonding of the microporous membrane to the nonwoven flat sheet is particularly critical as there is a need to maintain a high discharge rate which requires that there will be free mobility of the ionic species of the electrolyte between the anode and the cathode. The mobility of the ionic species is typically measured as electrical resistance (ER) or MacMullen number ($N_{MAC}$). MacMullen number is the ratio of electrical resistance of an electrolyte-saturated porous medium, r, to the electrical resistance of an equivalent volume of electrolyte, $r_0$. ($N_{MAC}=r/r_0$) See: U.S. Pat. No. 4,464,238, incorporated herein by reference. To ensure that this free mobility exists, merely laminating the microporous sheet to the nonwoven flat sheet may pose a problem of blinding (or closing) the pores of the microporous membrane since lamination requires the application of both heat at a temperature sufficient to melt (at least partially) the membrane, as well as pressure. Accordingly, there is a need for adhering the sheet to the membrane with a material that does not decrease ion mobility (or increase the electrical resistance) across the separator. To solve this problem, it is necessary to find an adhesive that is capable of swelling, when contacted by the electrolyte, thereby forming a bridge (or conduit) between the nonwoven sheet and the microporous membrane. The swelling of the adhesive is the result of absorption of the electrolyte into the adhesive. The electrolyte is a solution of solvent and salt, which provides the ionic species (the salt may also be referred solute). Once the electrolyte has swelled the adhesive, the ionic species may move relatively freely across the adhesive.

The adhesive is a swellable polymer. The adhesive is preferably applied to either the membrane or nonwoven or both (but preferably to the nonwoven) in the form of a solution. The solution is a dilute solution, e.g., 2, 4, 6, or 8% by weight, 4% being preferred. Additionally, the adhesive may also include a wetting agent. Thereafter, the separator (membrane, nonwoven, and adhesive solution) is subjected to lamination (temperature: no greater than 155° C., preferably 120–135° C.; pressures no greater than 750 psi, preferably about 500 psi as applied between nip rollers, one metal and the other nonmetal; speed: about 1 meter per minute), and optionally, a solvent wash. The solvent may be any solvent that will dissolve the swellable polymer and the wetting agent, for example, acetone.

The adhesive or swellable polymer may be selected from, but is not limited to, polyvinylidene fluoride (PVDF); polyurethane; polyethylene oxide (PEO); polyacrylonitrile (PAN); polymethylacrylate (PMA); poly(methylmethacrylate) (PMMA); polyacrylamide; polyvinyl acetate; polyvinylpyrrolidone; polytetraethylene glycol diacrylate; copolymers of any the foregoing and combinations thereof. One criterion for comonomer selection is the comonomer's ability to modify the surface energy of the homopolymer. Surface energy impacts, at least: the solubility of the copolymer, thereby affecting coating the copolymer onto the membrane; the adhesion of the copolymer to the membrane, thereby affecting battery manufacture and subsequent performance; and the wettability of the coating, thereby affecting absorption of liquid electrolyte into the separator. Suitable comonomers include, but are not limited to, hexafluoropropylene, octofluoro-1-butene, octofluoroisobutene, and tetrafluoroethylene. The comonomer content preferably ranges from 3 to 20% by weight, and most preferably, 7 to 15%. Preferably, the adhesive or swellable polymer is a copolymer of polyvinylidene fluoride. Preferably, the PVDF copolymer is a copolymer of polyvinylidene fluoride and hexafluoropropylene (PVDF:HFP), and, most preferably, the PVDF:HFP ratio is 91:9. The PVDF copolymers are commercially available from Elf Atochem, Philadelphia, Pa., USA; Solvay SA, Brussels, Belgium; and Kureha Chemical Industries, LTD, Ibaraki, Japan. A preferred PVDF:HFP copolymer is KYNAR 2800 from Elf Atochem.

The wetting agent is selected from materials that are compatible with (i.e., miscible with or will not phase separate from) the swellable polymer, that, in trace amounts (e.g., 10–20% of the swellable polymer), will not have a detrimental effect upon the battery chemistry (such as wetting agents that contain sulfones, sulphates, and nitrogen), and that are fluid at room temperature or have a Tg (glass transition temperature) <50° C. The wetting agent may be selected from, but is not limited to, phthalate-based esters, cyclic carbonates, polymeric carbonates, and mixtures thereof. Phthalate-based esters are selected from, but are not limited to, dibutyl phthalate (DBP). Cyclic carbonates are selected from ethylene carbonate (EC), propylene carbonate (PC), butylene carbonate (BC), and mixtures thereof. Polymeric carbonates are selected from, but are not limited to; polyvinylene carbonate, and linear propylene carbonates.

The instant invention may be further illustrated by the following example.

EXAMPLE

A separator was made from a microporous membrane (single layer, PE), paper (Schweitzer-Mauduit Grade 13LF from Schweitzer-Mauduit, Inc., Alpharetta, Ga.), and a solution containing acetone, 4% PVDF by weight acetone, and 8% DBP by weight acetone. The separator had a thickness of 2.1 mils, an electrical resistance of 5.25 $\Omega$-cm², MacMullen number of 8.8, and maintained its dimensional stability to 380° C.

The present invention may be embodied in other forms without departing from the spirit and the essential attributes thereof, and, accordingly, reference should be made to the appended claims, rather than to the foregoing specification, as indicated the scope of the invention.

We claim:

1. A battery separator comprising:
    a nonwoven flat sheet having a high temperature melt integrity;
    a microporous membrane having low temperature shutdown properties; and
    an adhesive bonding said nonwoven flat sheet to said microporous membrane, said adhesive being a swellable polymer selected from the group consisting of polyvinylidene fluoride; polyurethane; polyethylene oxide; polyacrylonitrile; polyacrylamide; polyvinyl acetate; polyvinylpyrrolidone; polytetraethylene glycol diacrylate; copolymers of any the foregoing and combinations thereof.

2. The battery separator of claim 1 wherein membrane being made from a thermoplastic polymer.

3. The battery separator of claim 1 wherein said nonwoven flat sheet being made of polymers selected from the group consisting of thermoplastic polymers, cellulosic, and/or ceramics.

4. A battery made with separator of claim 1.

5. A battery separator comprising:
    a nonwoven flat sheet having a high temperature melt integrity;
    a microporous membrane having low temperature shutdown properties; and
    an adhesive bonding said nonwoven flat sheet to said microporous membrane, said adhesive comprises a swellable polymer and a wetting agent.

6. The battery separator of claim 5 wherein said swellable polymer being selected from the group consisting of polyvinylidene fluoride; polyurethane; polyethylene oxide; polyacrylonitrile; polymethylacrylate; poly(methylmethacrylate); polyacrylamide; polyvinyl acetate; polyvinylpyrrolidone; polytetraethylene glycol diacrylate; copolymers of any the foregoing and combinations thereof.

7. The battery separator of claim 5 wherein said wetting agent being selected from the group consisting of phthalate-based esters, cyclic carbonates, polymeric carbonates, and mixtures thereof.

8. The battery separator of claim 5 wherein said membrane being made from a thermoplastic polymer.

9. The battery separator of claim 8 wherein said thermoplastic polymer being selected from the group consisting of polystyrenes, polyvinyl chlorides, polyacrylics, polyacetals, polyamides, polycarbonates, polyesters, polyetherimides, polyimides, polyketones, polyphenylene ethers, polyphenylene sulfides, and polysulfones.

10. The battery separator of claim 5 wherein said nonwoven flat sheet being made of polymers selected from the group consisting of thermoplastic polymers, cellulosic, and/or ceramics.

11. A battery separator comprising:
    a nonwoven flat sheet having a high temperature melt integrity, said nonwoven flat sheet further comprising a coating or surface treatment;
    a microporous membrane having low temperature shutdown properties; and
    an adhesive bonding said nonwoven flat sheet to said microporous membrane.

12. The battery separator of claim 11 wherein said coating or surface treatment being a ceramic material.

13. The battery separator of claim 12 wherein said ceramic material being selected from the group of alumina, silica, and zirconia compounds and combinations thereof.

14. The battery separator of claim 11 wherein said nonwoven flat sheet being made of polymers selected from the group consisting of thermoplastic polymers, cellulosic, and/or ceramics.

15. The battery separator of claim 11 wherein said membrane being made from a thermoplastic polymer.

16. The battery separator of claim 11 wherein said thermoplastic polymer being selected from the group consisting of polystyrenes, polyvinyl chlorides, polyacrylics, polyacetals, polyamides, polycarbonates, polyesters, polyetherimides, polyimides, polyketones, polyphenylene ethers, polyphenylene sulfides, and polysulfones.

17. Method of making separator comprising the steps of
    providing a nonwoven flat sheet,
    providing a microporous membrane,
    providing an adhesive solution comprising a solvent, a swellable polymer, and a wetting agent,
    coating said sheet or said membrane or both said sheet and membrane with the adhesive solution,
    laminating together the nonwoven flat sheet and the membrane, and
    forming thereby the separator.

18. The method of claim 17 wherein laminating further comprises applying temperature of about 120–135° C.

19. The method of claim 17 further comprising washing the laminated separator with a solvent.

* * * * *